Sept. 1, 1959     C. M. HUTH     2,902,536
STRAIN RELIEF
Filed Oct. 24, 1956
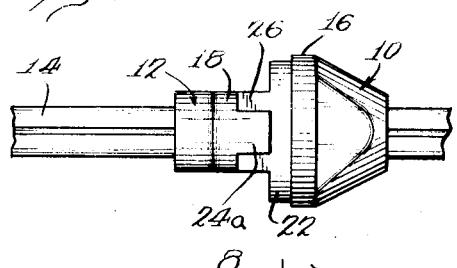
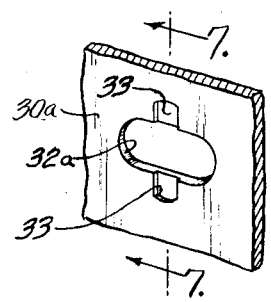
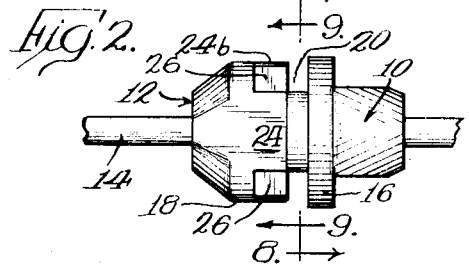
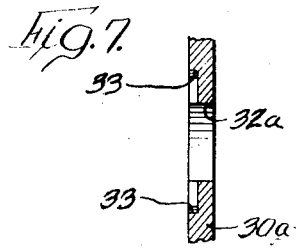
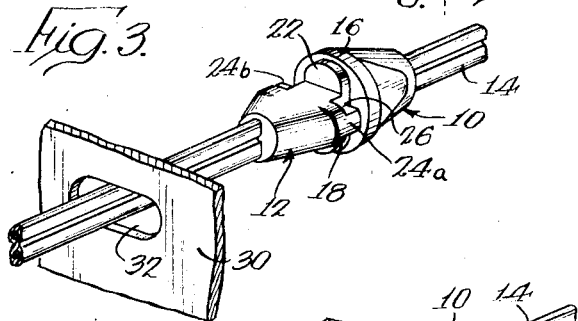
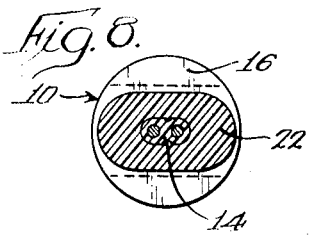
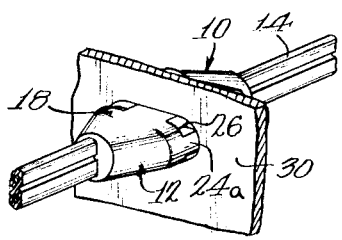
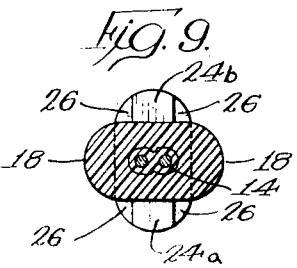
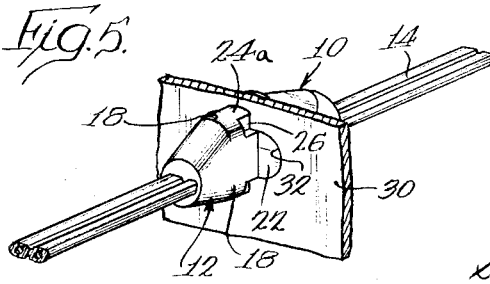
INVENTOR.
Carl M. Huth
BY
Soans, Anderson, Luedeka & Fitch
Attys.

United States Patent Office 2,902,536
Patented Sept. 1, 1959

2,902,536

STRAIN RELIEF

Carl M. Huth, Richmond, Ind., assignor to Belden Manufacturing Company, Chicago, Ill., a corporation of Illinois Application October 24, 1956, Serial No. 617,954

1 Claim. (Cl. 174—70)

The present invention relates to strain reliefs and particularly bushing type strain reliefs which are adapted for use with electrical conductor cords to prevent axial displacement of such cords relative to an appliance or other electrical apparatus.

Bushing type strain reliefs generally comprise an enlargement which is bonded or otherwise mechanically attached to the conductor cord and which affords means for mechanically connecting the strain relief to the frame or some other portion of the associated apparatus. Such strain reliefs are particularly satisfactory due to their low cost and ease of manufacture. However, other important factors in selecting a strain relief are the ease with which the strain relief can be assembled and disassembled relative to the associated apparatus. In this latter respect, there are particular problems which arise with the use of plastic materials for strain reliefs which are not satisfactorily solved by the prior devices.

The present invention, therefore, is concerned with the provision of an improved bushing type strain relief. Another object of the invention is the provision of an improved bushing type strain relief which is particularly adapted to plastic construction and which is arranged to facilitate attachment of the strain relief to the structure of the associated apparaus and which makes the disassembly of such strain relief from the structure easier to effect. Other objects and advantages will be made more apparent in the accompanying drawings and the following description of the preferred embodiment of this invention.

In the drawings:

Figure 1 is a side elevational view of a strain relief, in accordance with the invention, applied to a two-conductor electrical conductor cord;

Figure 2 is a plan view of the strain relief shown in Figure 1;

Figures 3, 4 and 5 are perspective views showing the manner in which the strain relief is put into use;

Figure 6 is a perspective view of a modified form of plate structure for use with the strain relief shown in the preceding figures;

Figure 7 is a sectional view, taken along the line 7—7 in Figure 6;

Figure 8 is a sectional view taken along the line 8—8 in Figure 2; and

Figure 9 is a sectional view taken along the line 9—9 in Figure 2.

The strain relief means illustrated in the drawings is of the bushing or sleeve type and includes two main body portions 10 and 12 which are attached to the conductor cord 14 with which the device is used. The body portion 10 of the strain relief tapers in the direction of the outer end thereof and has an inner end or abutment portion 16 which is of substantially uniform thickness longitudinally of the bushing. The abutment portion 16 has a generally circular cross-sectional outline, although it will be apparent from the following description that another configuration might be used for this abutment portion.

The body portion 12 of the strain relief also tapers in the direction of the outer end thereof and also terminates in an inner end or abutment portion 18 of uniform thickness. The abutment portion 18 is generally oval in cross-section with the minor cross-sectional axis having a distance much less than the cross-sectional axis of the abutment portion 16. The two main body portions 10 and 12 of the strain relief are partially separated from each other by an intermural space 20 which has the general form of an interrupted annular groove.

The face of the abutment portion 16 is provided with an integral boss or projection 22 which is of generally the same form and cross-sectional area as the abutment portion 18. The boss or projection 22 is disposed with its major axis rotated 90° from the major axis of the oval shaped abutment portion 18.

The abutment portion 18 is also provided with an integral boss or projection 24, which extends from the abutment 18 in the direction of the abutment 16 and terminates generally in the plane of the outer face of the boss 22. The projection 24 is disposed along the major axis of the adjoining surface of the oval-shaped abutment 18 and, at opposite ends thereof, the projection 24 includes a pair of end portions 24a and 24b which are substantially reduced in width with respect to the width of the associated abutment 18 to thereby provide the recesses or grooves indicated at 26. The central portion of the boss or projection 24 is essentially coextensive in width with the oval-shaped abutment 18 as well as the abutment 22.

The strain relief can be most conveniently made by molding it directly onto the cord with which it is to be used, and in order to obtain all of the advantages of the invention at least part of the strain relief should be of a resilient yieldable material. This invention is particularly advantageous in connection with strain reliefs which are made of plastic compounds, such as a vinyl plastic, similar to those commonly used for molding conductor cord insulation and the bodies of electrical connector plugs and the like. While the particular conductor cord 14 illustrated in the drawings is of the two-conductor type and provided with a molded-on insulation, it will be understood that the strain reliefs of the invention are suitable for use with single or multiple conductors and may be advantageously employed with cords having other types of insulation.

The frame or similar portion of the apparatus with which the strain relief is to be used is provided with an opening, which is most conveniently of substantially the same outline as one of the abutment portions, such as the abutment 18 in the illustrated structure, so that the frame opening is adapted to receive one of the main body portions of the device during the assembly operation. As seen particularly in Figures 3, 4 and 5, the described strain relief is employed in connection with a plate member 30, which might be a portion of the frame of a small electrical appliance, having an opening 32 therethrough of substantially the same size and configuration as the body portion 12. The conductor cord 14 is introduced through the opening 32 with the body portion 12 of the strain relief closest to the plate 30. The body portion 12 is moved through opening 32 to a position wherein the boss 22 on the abutment surface 16 is flush with the outside of the plate 30, as seen in Figure 4. In this position the projections 24a and 24b are disposed within the opening 32 in the plate member. The strain relief is then rotated 90° to bring the parts into the position shown in Figure 5, which is the normal operating position of the strain relief. In this latter position, the abutment portion 18 and the boss 24 are disposed with their major axis at right angles to the major axis of the oval opening 32, and the boss 22 is seated within the opening 32 so as to resist turning of the strain relief.

In rotating the strain relief from the position shown in Figure 4 to the position shown in Figure 5, the bosses 24a and 24b, which are of plastic or similar yieldable material, will yield in the opposite direction to the direction of rotation and the upper leading corner of each of the bosses 24a and 24b which is in contact with the sides of the opening 32 during rotation will yield radially inwardly. This presents guiding surfaces for the sides of the opening 32 which will tend to bring the abutment surface 16 nearer to the outside of plate 30 as the strain relief is rotated. Thus the strain relief requires very little axial pressure and will tend to snap into the normal operating position.

As indicated above, the oppositely facing surfaces of the bosses 22 and 24 are essentially coplanar. It will be understood of course, depending upon the particular requirements, that the bosses 24 and 22 might be made to terminate in slightly spaced relation to each other or, alternatively, in slightly overlapping relation. This would depend largely upon the thickness of the plate portion receiving the strain relief and upon the resiliency of the material comprising the bosses 24 and 22. Preferably, the thickness of the boss 22 is approximately the same as the thickness of the plate 30 receiving the strain relief. In any event, it is preferable that this boss 22, which is received by the plate opening, is of sufficient thickness and rigidity to prevent inadvertent turning of the strain relief relative to the plate once it is in position.

The width of the intermural space 20, which also includes the grooves 26, will be dependent largely upon the thickness of the plate 30 and the resiliency of the material used for the bosses 24 and 22. It is particularly important that the bosses 24a and 24b are constructed and arranged so that they do not seriously hamper the rotation of the strain relief element, and that they aid in placing the boss 22 in its operative position shown in Figure 5. In order to successfully accomplish these purposes, the pair of bosses 24a and 24b are substantially reduced in width with respect to the associated abutment 18. While extending along the major axis of the oval shaped body 12 a sufficient distance to afford locking the strain relief in position upon rotation thereof relative to the opening 30 in the plate, the bosses 24a and 24b are made relatively narrow and of yieldable material so that they can readily flex and thus permit relatively easy rotation of the strain relief. It will be seen from the foregoing, that it is important that these bosses 24a and 24b yield radially of the conductor cord as well as transversely thereof, in order to provide ready insertion of the strain relief in snug position on the plate. At the same time, there is provided sufficient body of material in the bosses 24a and 24b and the abutment surface 18 to transmit any strain which may be placed on the cord to the plate 30. Stressing of the electrical connections to the cord structures is thereby effectively prevented. At the same time, should it be desired to remove the cord for repair or service, this may be readily done by rotating the strain relief so as to again bring the narrower body portion 12 and the boss 24 into position for passage through the opening 32 in the plate 30.

A modified form of plate structure, such as that shown in Figures 6 and 7, may be used to advantage with a strain relief of the above described type. The modified plate 30a includes a generally oval-shaped opening 32a which conforms generally with the configuration of the body portion 12 in the manner of the previously described opening 32 in the plate 30 of Figures 3–5. In addition, there is provided on one side of the modified plate 30a a pair of recesses 33 forming end portions of a generally oval-shaped groove having its major axis intersecting the center of the major axis of the opening 32a.

In using the modified form of plate structure 30a as an anchor for the strain relief, the body portion 12 is passed through the opening 32a from the side of the plate opposite that including the recesses 33. When the strain relief is in position with the body portions on opposite sides of the plate, similar to the position shown in Figure 4, the strain relief is rotated 90 degrees and the bosses 24a and 24b move into the recesses 33 in the plate. This effectively locks the strain relief against any inadvertent rotation. Of course, when it is desired to remove the strain relief and its associate conductor cord from the plate structure 30a, the bosses 24a and 24b can be removed from engagement with the recesses 33 by pushing the body portion 10 against the plate while rotating the strain relief 90 degrees. The depth of the recesses 33 is coordinated with the resiliency of the bosses 24a and 24b to make this release of the strain relief possible. Once the body portion 12 is again aligned with the opening 32a it can, of course, be withdrawn through the opening.

The use of a plate such as that shown in Figures 6 and 7 is particularly advantageous when the strain relief is used in connection with a relatively thick plate or frame member, and when the strain relief is to be received by a casting wherein the opening for receiving the strain relief may vary appreciably in its dimensions from the size of the oval-shaped body portion of the strain relief. In the case of a thick plate, wherein the plate is thicker than the annular groove around the oval-shaped boss 22 of the strain relief, the relatively narrow bosses 24a and 24b will yield to sufficient turning of the strain relief to permit these bosses to enter the recesses 33 and hold the strain relief in position. When a rather roughly dimensioned opening 32a is provided in the plate, as by casting, the recesses 33 serve to anchor the strain relief against rotation, which might not otherwise be possible because of the loose fit provided between the oval boss 22 and the opening 32a.

It is seen, therefore, that there is provided herein an improved form of strain relief which offers particular advantages with respect to the ease of assemblying and disassembling the strain relief relative to a supporting frame structure. Although shown and described with respect to particular embodiments, it will be apparent to those skilled in the art that other embodiments might readily be made without departing from the principles of the invention.

I claim:

In combination, a plate member having a non-circular opening formed therein and including a pair of recesses formed on one side of said plate member in contiguous relation to opposite edges of the non-circular opening along the minor axis thereof, an electrical conductor cord, and a bushing-type strain relief which is attached to said cord and which is received within said non-circular opening, said strain relief bushing having two main body portions which terminate in opposed, substantially parallel, abutment surfaces which are separated by a groove-like intermural space having a maximum width greater than the thickness of said plate member, one of said body portions having maximum cross-sectional dimensions generally corresponding to those of the non-circular opening in said plate member so that it can be inserted into the non-circular opening, a first boss of yieldable material which projects from the abutment surface of said one body portion into said intermural space, said first boss having a major cross-sectional axis substantially greater than the minor cross-sectional axis of the non-circular opening in said plate member, with outer ends of said boss along said major cross-sectional axis being substantially narrower in width than the adjoining abutment surface of said one body portion and conforming generally in size with the area of said pair of recesses in said plate member, a second boss of yieldable material which projects from the abutment surface of the other of said body portions into said intermural space and which terminates at its outer face generally in the plane of the outer face of said first boss, said second boss being of substantially the same cross-sectional configuration as that of said non-circular opening and having its major cross-sectional axis disposed at right angles with respect to the major cross-sectional axis of said first boss.

References Cited in the file of this patent
UNITED STATES PATENTS 2,494,814    Huth _____ Jan. 17, 1950